(12) United States Patent
Park et al.

(10) Patent No.: US 8,831,438 B2
(45) Date of Patent: Sep. 9, 2014

(54) APPARATUS FOR TRANSMITTING AND RECEIVING VISIBLE LIGHT COMMUNICATION DATA

(75) Inventors: Sung-Bum Park, Suwon-si (KR); Yun-Je Oh, Suwon-si (KR); Dae-Kwang Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 849 days.

(21) Appl. No.: 12/569,296

(22) Filed: Sep. 29, 2009

(65) Prior Publication Data

US 2010/0135671 A1 Jun. 3, 2010

(30) Foreign Application Priority Data

Nov. 28, 2008 (KR) ........................ 10-2008-0120002

(51) Int. Cl.
| | | |
|---|---|---|
| *H04B 10/00* | (2013.01) | |
| *H04B 10/04* | (2006.01) | |
| *H04B 10/12* | (2006.01) | |
| *H04B 10/116* | (2013.01) | |
| *H04B 10/114* | (2013.01) | |
| *H04J 14/02* | (2006.01) | |

(52) U.S. Cl.
CPC ........... *H04B 10/116* (2013.01); *H04J 14/0279* (2013.01); *H04J 14/02* (2013.01); *H04B 10/1141* (2013.01)
USPC ........... 398/172; 398/118; 398/127; 398/140; 398/153; 398/182; 398/185

(58) Field of Classification Search
CPC .. H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/502
See application file for complete search history.

(56) References Cited

U.S. PATENT DOCUMENTS

| | | | | |
|---|---|---|---|---|
| 4,706,300 | A | * 11/1987 | Minemura et al. | ............ 398/204 |
| 4,878,174 | A | * 10/1989 | Watkins et al. | ................ 712/245 |
| 2006/0239689 | A1* | 10/2006 | Ashdown | ....................... 398/130 |
| 2008/0170863 | A1* | 7/2008 | Won et al. | ...................... 398/172 |
| 2008/0181617 | A1 | 7/2008 | Ann | |
| 2008/0298811 | A1 | 12/2008 | Son et al. | |
| 2009/0208221 | A1 | 8/2009 | Sasai | |
| 2009/0213099 | A1 | 8/2009 | Park et al. | |

FOREIGN PATENT DOCUMENTS

| | | |
|---|---|---|
| JP | 2006-203669 | 8/2006 |
| KR | 1020080066893 | 7/2008 |
| KR | 1020080105277 | 12/2008 |

* cited by examiner

*Primary Examiner* — Darren E Wolf
(74) *Attorney, Agent, or Firm* — The Farrell Law Firm, P.C.

(57) ABSTRACT

An apparatus for transmitting visible light communication data is provided, the apparatus including a common modulation unit generating a modulated signal for transmitting a first visible light communication data, a plurality of individual modulation units generating modulated signals for transmitting a plurality of second visible light communication data, and a plurality of light emitting units receiving the modulated signals from the plurality of individual modulation units, respectively, and outputting visible light signals, wherein an output of the common modulation unit is the input as an output control signal of the individual modulation units.

7 Claims, 5 Drawing Sheets

APPARATUS FOR TRANSMITTING AND
RECEIVING VISIBLE LIGHT
COMMUNICATION DATA

PRIORITY

This application claims priority under 35 U.S.C. §119(a) to an application entitled "Apparatus For Transmitting And Receiving Visible Light Communication Data" filed in the Korean Industrial Property Office on Nov. 28, 2008 and assigned Serial No. 10-2008-0120002, the contents of which are hereby incorporated by reference.

BACKGROUND OF THE INVENTION

1. Field of the Invention

The present invention generally relates to visible light communication, and more particularly, to an apparatus for transmitting and receiving data by a wavelength division multiplexing method.

2. Description of the Related Art

Recently, concerns about optical wireless technology that is complementary with RF technology have been increasing due to the exhaustion of RF (Radio Frequency) bands, the possibility of crosstalk among several wireless communication technologies, increasing requirements for communication security, introduction of an ultrahigh speed ubiquitous communication environment of the 4G wireless technology, etc.

In particular, since visible light communication for transferring information using visible light is safe, and has wide-use bands, visible light communication can be freely used without any restrictions. Also, since the light destination or the direction of travelling light can be seen, the reception range of information can be recognized accurately. Visible light communication also has reliable security, and can be driven by low power to reduce power consumption. In addition, visible light communication can be applied to hospitals and airplanes in which the use of radio frequencies is limited, and can provide additional information services using electric signboards. Accordingly, research into visible light wireless communication has been made in many companies and research institutes.

Further, visible light communication enables data transmission by a wavelength division multiplexing method using different visible light wavelength bands. Accordingly, it becomes possible to transmit different data, which correspond to different wavelengths, using Light Emitting Diodes (LEDs) generating a plurality of colored visible lights (e.g., red, green, and blue visible lights).

SUMMARY OF THE INVENTION

Accordingly, the present invention has been made to solve the above-mentioned problems occurring in the prior art, and the present invention provides a visible light communication apparatus that can transmit a plurality of data through visible light signals of a plurality of wavelength bands, and can simultaneously transmit data of which long-distance transmission is required.

In accordance with an aspect of the present invention, there is provided an apparatus for transmitting visible light communication data, the apparatus including a common modulation unit for generating a modulated signal for transmitting a first visible light communication data; a plurality of individual modulation units for generating modulated signals for transmitting a plurality of second visible light communication data; and a plurality of light emitting units for receiving the modulated signals from the plurality of individual modulation units, respectively, and outputting visible light signals; wherein an output signal of the common modulation unit is the input as an output control signal of the plurality of individual modulation units.

In accordance with another aspect of the present invention, there is provided an apparatus for receiving visible light communication data, the apparatus including a common demodulation unit receiving a signal formed by the combination of a plurality of visible light wavelength band signals, and demodulating a first visible light communication data; a visible light separation unit separating the received signal into the plurality of visible light wavelength band signals; and a plurality of individual demodulation units receiving the separated wavelength band signals, and demodulating a second visible light communication data.

Preferably, the visible light separation unit includes at least filters for extracting red, green, and blue lights; and the common demodulation unit demodulates a white light signal generated by a combination of the red, green, and blue lights, and the plurality of individual demodulation units demodulate red, green, and blue light wavelength band signals.

More preferably, the common demodulation unit detects the signal formed by the combination through envelope detection.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS

The following description, with reference to the accompanying drawings, is provided to assist in a comprehensive understanding of certain embodiments of the present invention. Accordingly, it includes various specific details to assist in that understanding. However, these specific details are to be regarded as merely exemplary. Further, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to their dictionary meanings, but are used to enable a clear and consistent understanding of the invention. It should be apparent to those skilled in the art that the following description of embodiments of the present invention are provided for illustration purpose only and not for the purpose of limiting the present invention as will be defined by the appended claims and their equivalents.

In performing visible light communication using visible light signals of different wavelength bands (e.g., a red light signal, a green light signal, and a blue light signal), the visible light signals of different wavelength bands are simultaneously modulated, or the visible light signals of the respective wavelength are individually modulated. If the visible light signals of different wavelength bands are simultaneously modulated, the light output becomes relatively high to facilitate long-distance communication, but a plurality of data cannot be modulated. By contrast, if the visible light signals of the respective wavelength bands are individually modulated, simultaneous modulation of different kinds of information becomes possible to relatively increase the transmission capacity, but the overall light output is relatively lowered, which increases the difficulty of long-distance transmissions. In consideration of the above-described problems, the present invention provides a visible light communication apparatus that can transmit a plurality of data by modulating the visible light signal of the plurality of wavelength bands, and while simultaneously transmitting data of which long-distance transmission is required.

Figure 1:
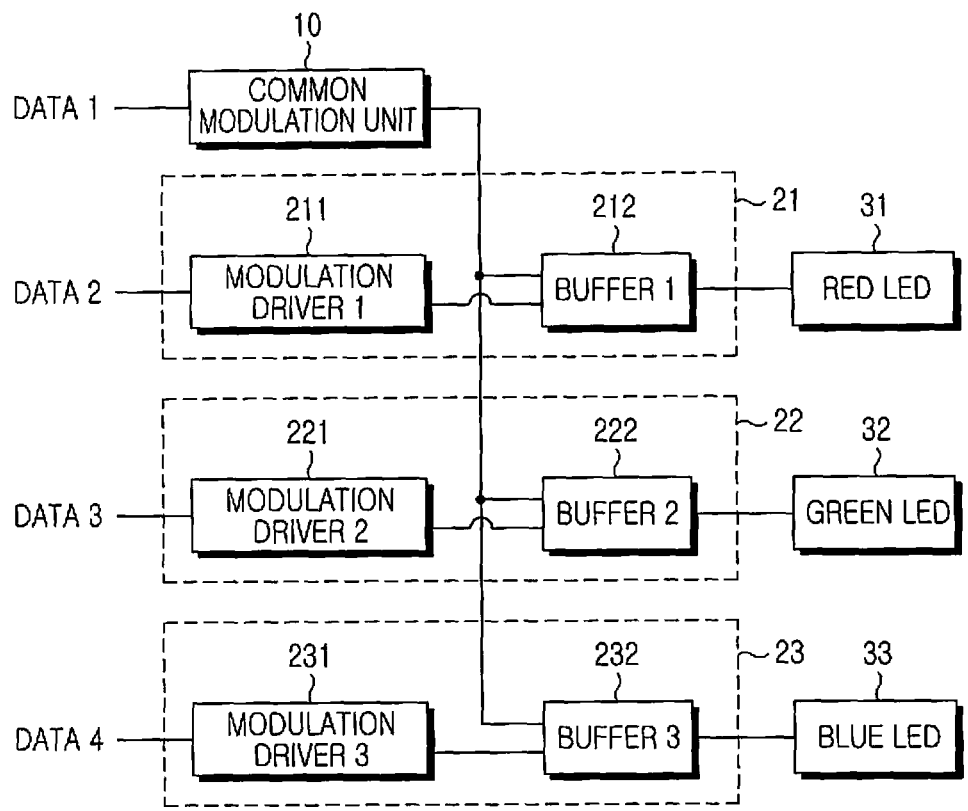
FIG. 1 is a block diagram schematically illustrating the configuration of an apparatus for transmitting visible light communication data according to a first embodiment of the present invention.

FIG. 1 is a block diagram schematically illustrating the configuration of an apparatus for transmitting visible light communication data according to a first embodiment of the present invention. Referring to FIG. 1, the apparatus for transmitting visible light communication data according to the first embodiment of the present invention includes a common modulation unit 10, a first modulation unit 21, a second modulation unit 22, a third modulation unit 23, a red LED 31, a green LED 32, and a blue LED 33.

The common modulation unit 10 may be a driver that receives first data and modulates the first data into a signal for visible light communication.

The first modulation unit 21 receives second data and modulates the second data into a signal for visible light communication. The signal modulated through the first modulation unit 21 is input as a driving signal of the red LED 31. The first modulation unit 21 may preferably include a first modulation driver 211 and a first buffer 212. The first modulation driver 211 modulates the signal for visible light communication, and the first buffer 212 temporarily stores the modulated signal and outputs the modulated signal in a First In, First Out (FIFO) manner.

The second modulation unit 22 receives third data and modulates the third data into a signal for visible light communication. The signal modulated through the second modulation unit 22 is input as a driving signal of the green LED 32. The second modulation unit 22 may preferably include a second modulation driver 221 and a second buffer 222. The second modulation driver 221 modulates the signal for visible light communication, and the second buffer 222 temporarily stores the modulated signal and outputs the modulated signal in a FIFO manner.

The third modulation unit 23 receives fourth data and modulates the fourth data into a signal for visible light communication. The signal modulated through the third modulation unit 23 is input as a driving signal of the blue LED 33. The third modulation unit 23 may preferably include a third modulation driver 231 and a third buffer 232. The third modulation driver 231 modulates the signal for visible light communication, and the third buffer 232 temporarily stores the modulated signal and outputs the modulated signal in a FIFO manner.

The red LED 31, the green LED 32, and the blue LED 33 emit visible light corresponding to their respective colors. The red LED 31, the green LED 32, and the blue LED 33 are also connected to the first modulation unit 21, the second modulation unit 22, and the third modulation unit 23, respectively, and are driven on the basis of the signals from the first modulation unit 21, the second modulation unit 22, and the third modulation unit 23, respectively.

The output of the common modulation unit 10 is input as a control signal for controlling the first modulation unit 21, the second modulation unit 22, and the third modulation unit 23. In particular, as the first modulation unit 21, the second modulation unit 22, and the third modulation unit 23 are provided with the buffers 212, 222, and 232, respectively, the output of the common modulation unit 10 is used as a control signal for controlling the outputs of the buffers 212, 222, and 232.

Figure 2:
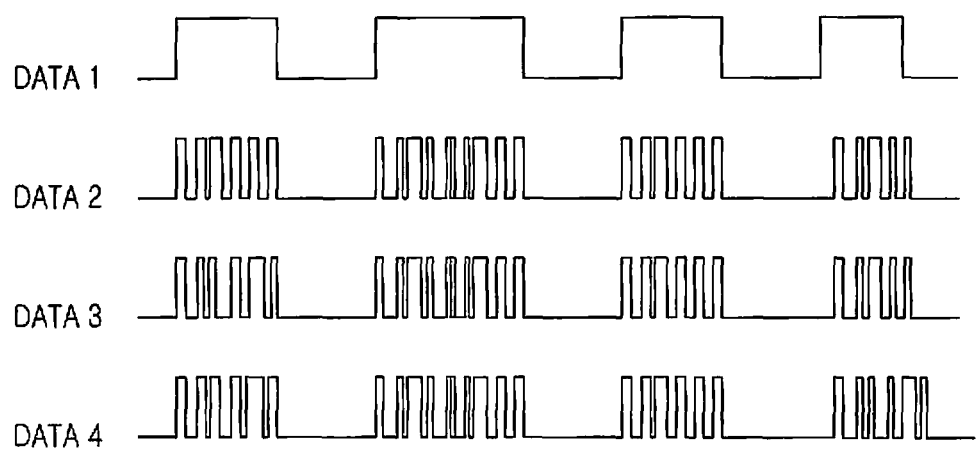
FIG. 2 is a timing diagram corresponding to an apparatus for transmitting visible light communication data according to the first embodiment of the present invention.

FIG. 2 is a timing diagram explaining an apparatus for transmitting visible light communication data according to the first embodiment of the present invention. Referring to FIG. 2, the first to fourth data signals exemplify the timings of the signals output from the common modulation unit 10, the first modulation unit 21, the second modulation unit 22, and the third modulation unit 23, respectively.

The signal output from the common modulation unit 10 is input as the control signal for the outputs of the buffers 212, 222, and 232, and when the signal output from the common modulation unit 10 becomes a high-level signal, the buffers 212, 222, and 232 output the temporarily stored data. The outputs of the buffers 212, 222, and 232 are input to the LEDs 31, 32, and 33 which emit the visible lights of different wavelength bands corresponding to the color red, green, and blue, respectively. In the state where the common modulation unit 10 outputs a high-level signal, the LEDs 31, 32, and 33 output the high-speed visible light signals. Accordingly, separate visible light signals are further generated in accordance with the color combination of the LEDs 31, 32, and 33. The visible light signals generated in accordance with the color combination have relatively low speeds and high outputs in comparison to the visible light signals output from the respective LEDs 31, 32, and 33.

According to the apparatus for transmitting visible light communication data according to the first embodiment of the present invention, the data, of which the high-speed transmission is required, are transmitted through the first modulation unit 21, the second modulation unit 22, and the third modulation unit 23. The data, of which the high output is required, are transmitted through the common modulation unit 10. For example, in the case of outputting an advertisement of a specified company through a large-scale display that supports the visible light communication, the data transmitted through the common modulation unit 10 (e.g., the first data) may be a list of advertisement moving images, a list of advertisement music, and the like. Also, the data transmitted through the first modulation unit 25, the second modulation unit 22, and the third modulation unit 23 (e.g. the second data, the third data, and the fourth data) may be data for playing back the advertisement moving images, the advertisement music, and the like, of which the high-speed transmission is required.

Figure 3:
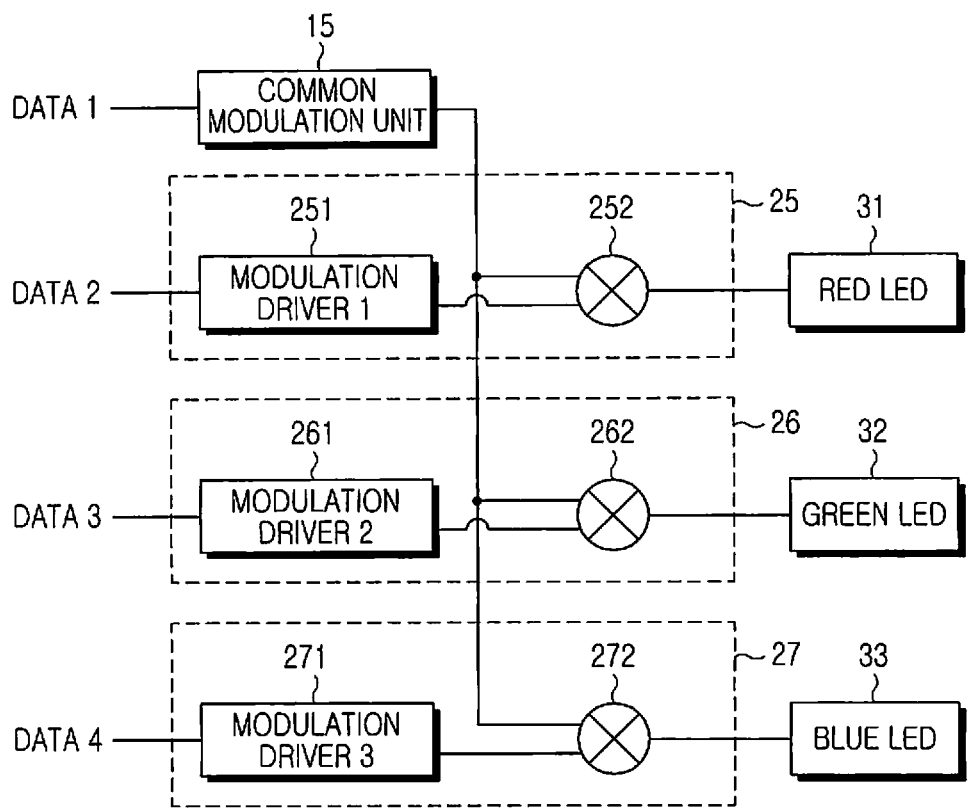
FIG. 3 is a block diagram schematically illustrating the configuration of an apparatus for transmitting visible light communication data according to a second embodiment of the present invention.

FIG. 3 is a block diagram schematically illustrating a configuration of an apparatus for transmitting visible light communication data according to a second embodiment of the present invention.

Referring to FIG. 3, the apparatus for transmitting visible light communication data according to the second embodiment of the present invention includes a common modulation unit 15, a first modulation unit 25, a second modulation unit 26, a third modulation unit 27, a red LED 31, a green LED 32, and a blue LED 33.

The apparatus for transmitting visible light communication data according to the second embodiment of the present invention has substantially the same configuration as the apparatus for transmitting visible light communication data according to the first embodiment of the present invention. However, the apparatus for transmitting visible light communication data according to the second embodiment of the present invention is provided with arithmetic logic units 252, 262, and 272 in place of the buffers 212, 222, and 232 of the first to third modulation units 21, 22, and 23 provided in the apparatus for transmitting visible light communication data according to an embodiment of the present invention. Preferably, the arithmetic logic units 252, 262, and 272 may be devices for performing multiplication operations.

Further, in order to ease synchronization on the receiving side, it is preferable that the common modulation unit 15 modulates the data based on a Manchester encoding method. Also, it is preferable that the first to third modulation units 21, 22, and 23 modulate the same data twice in a period.

Figure 4:
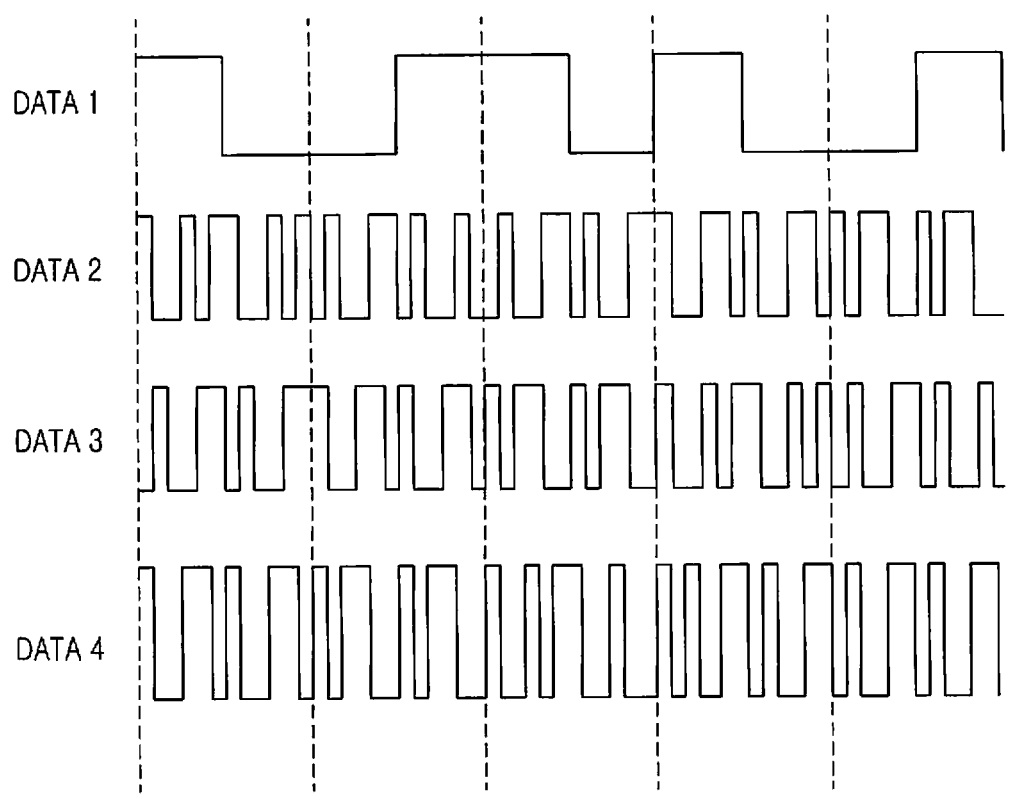
FIG. 4 is a timing diagram corresponding to an apparatus for transmitting visible light communication data according to the second embodiment of the present invention.

FIG. 4 is a timing diagram explaining an apparatus for transmitting visible light communication data according to the second embodiment of the present invention. Referring to FIG. 4, the first to fourth data signals exemplify timings of the signals output from the common modulation unit 15, the first modulation driver 251, the second modulation driver 261, and the third modulation driver 271, respectively.

The output of the common modulation unit 15 is modulated on the basis of the Manchester encoding method, and the first to third modulation drivers 251, 261, and 271 modulate the same data twice in ½ a period. Accordingly, when the output signal of the common modulation unit 15 becomes a high level signal, the arithmetic logic units 252, 262, and 272 output the modulated signals. Consequently, the LEDs 31, 32, and 33 transmit the first data as a signal in which plural color visible lights are combined, on the basis of the Manchester encoding code, and simultaneously transmit the second, third, and fourth data in ½ a period as the respective color visible light signals.

In the embodiments of the present invention, it is exemplified that the apparatus for transmitting visible light communication data modulates the signals using the specified modulation methods. The modulation methods according to the present invention are not limited to the modulation methods of the above-described embodiments of the present invention. Diverse modified modulation methods can be applied to apparatuses according to embodiments of the present invention.

Figure 5:
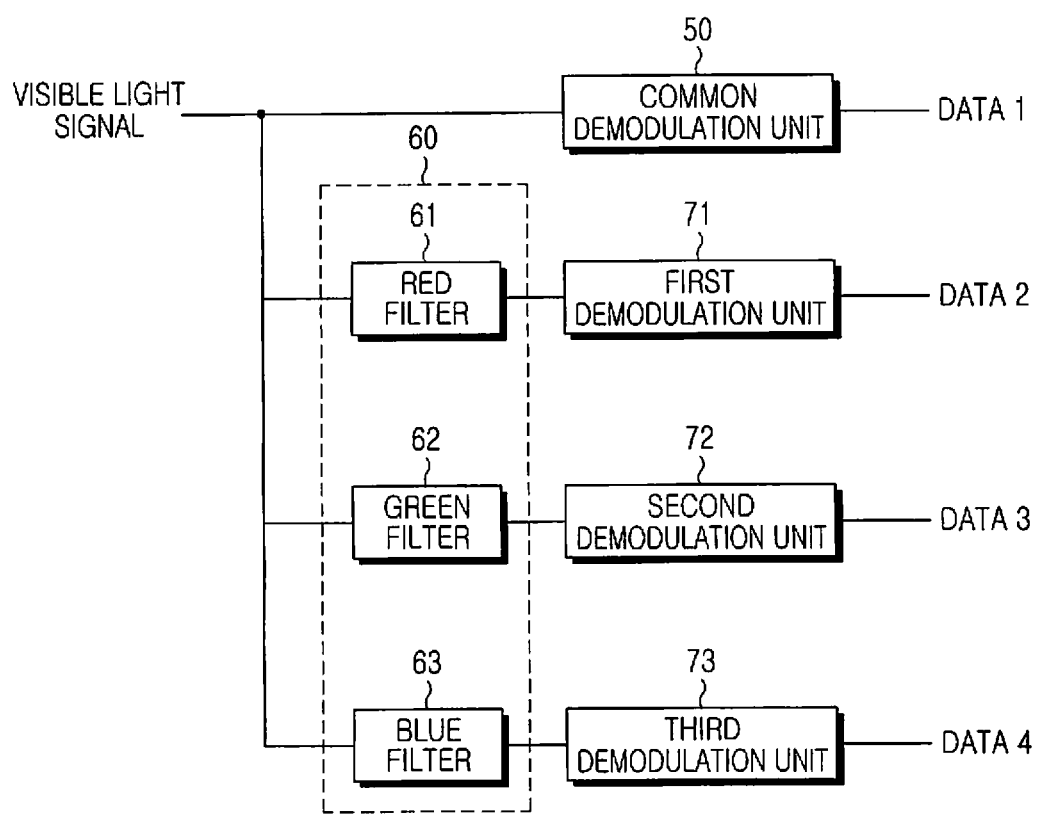
FIG. 5 is a block diagram schematically illustrating the configuration of an apparatus for receiving visible light communication data according to an embodiment of the present invention.

FIG. 5 is a block diagram schematically illustrating the configuration of an apparatus for receiving visible light communication data according to an embodiment of the present invention. Referring to FIG. 5, the apparatus for receiving visible light communication data according to an embodiment of the present invention includes a common demodulation unit 50, a visible light separation unit 60, a first demodulation unit 71, a second demodulation unit 72, and a third demodulation unit 73.

The common demodulation unit 50 receives the visible light signal output from the apparatus for transmitting visible light communication data according to an embodiment of the present invention, and restores the first data by demodulating the received signal. Since the visible light signal demodulated by the common demodulation unit 50 is a signal generated by the combination of plural color visible light signals, it is preferable that the common demodulation unit 50 demodulates the visible light signal through envelope detection.

The visible light separation unit 60 separates wavelength band signals of specified colors from the visible light signal output from the transmitting device, and transmits the separated signals to the first to third demodulation units 71, 72, and 73, respectively.

Preferably, the visible light separation unit 60 includes a red filter 61, a green filter 62, and a blue filter 73 for passing the wavelength band signals of the specified colors separated from the visible light signal. The red filter 61 passes the visible light of the main wavelength band emitted from the red LED 31, the green filter 62 passes the visible light of the main wavelength band emitted from the green LED 32, and the blue filter 73 passes the visible light of the main wavelength band emitted from the blue LED 33. The red filter 61, the green filter 62, and the blue filter 73 are connected to the first to third demodulation units 71, 72, and 73, respectively.

The first to third demodulation units 71, 72, and 73 receive the visible light signals of the specified colors separated through the visible light separation unit 60, and demodulate the input visible light signals to output the second to fourth data.

In the above-described embodiments of the present invention, the data from the first to third modulation units 21, 22, and 23 are output through the visible lights of red, green, and blue, and the signal from the common modulation unit 10 is output through a white visible light generated by a combination of red, green, and blue visible lights. Further, in the above-described embodiments of the present invention, the visible light separation unit 60 of the apparatus for receiving the visible light communication data separates the visible light into the red, green, and blue visible lights, and the common demodulation unit 50 demodulates the which visible light signal generated by a combination of red, green, and blue visible lights. However, the present invention is not limited thereto, and the color visible lights used in the apparatus for transmitting/receiving visible light communication data and the visible light generated by a combination of the color visible lights can be diversely modified and used by a person of ordinary skill in the technical field of the present invention.

As described above, according to the present invention, since the visible light signals of different wavelengths are individually modulated at high speed, and the combination of all the visible light signals is simultaneously modulated at low speed, the visible light information broadcast can be provided such that the common information is broadcast over a long distance, and the individual information is broadcast over a short distance at a high speed. Also, by simultaneously transmitting data for long-distance and short-distance communication, the data transmission efficiency can be heightened, and the limited communication resources can be used efficiently.

While the invention has been shown and described with reference to certain exemplary embodiments thereof, it will be understood by those skilled in the art that various changes in form and details may be made therein without departing from the spirit and scope of the invention as defined by the appended claims.

What is claimed is:
1. An apparatus for transmitting visible light communication data, comprising:
   a common modulation unit configured to generate a modulated signal for transmitting a first visible light communication data;

a plurality of individual modulation drivers configured to generate modulated signals for transmitting a plurality of second visible light communication data, based on the modulated signal for transmitting the first visible light communication data output from the common modulation unit;

a plurality of arithmetic logic units, with each arithmetic logic unit configured to receive the modulated signal from the common modulation unit, each arithmetic logic unit configured to receive a modulated signal from a respective one of the plurality of individual modulation drivers, and each arithmetic logic unit configured to output a mixed modulation signal; and a plurality of light emitting units, with each of the plurality of light emitting units configured to receive one of the mixed modulated signals from the plurality of arithmetic logic units, respectively, and each of the plurality of light emitting units configured to output a visible light signal representing the first visible light communication data and a respective one of the second visible light communication data.

2. The apparatus as claimed in claim 1, wherein the common modulation unit modulates the data at a speed relatively lower than a modulation speed of the arithmetic logic units.

3. The apparatus as claimed in claim 1, wherein the plurality of light emitting units include light emitting diodes outputting red, green, and blue lights, and the plurality of second visible light communication data are transmitted through the red, green, and blue lights, while the first visible light communication data is transmitted through white light by a combination of the light emitting diodes outputting the red, green, and blue lights.

4. The apparatus as claimed in claim 2, wherein the plurality of light emitting units include light emitting diodes outputting red, green, and blue lights, and the plurality of second visible light communication data are transmitted through the red, green, and blue lights, while the first visible light communication data is transmitted through white light by a combination of the light emitting diodes outputting the red, green, and blue lights.

5. A system for transmitting visible light communication data, comprising:

an apparatus for transmitting visible light communication data; and an apparatus for receiving visible light communication data, wherein the apparatus for transmitting visible light communication data comprises:

a common modulation unit configured to generate a modulated signal for transmitting a first visible light communication data, a plurality of individual modulation drivers configured to generate modulated signals for transmitting a plurality of second visible light communication data, based on the modulated signal for transmitting the first visible light communication data output from the common modulation unit, a plurality of arithmetic logic units, with each arithmetic logic unit receiving the modulated signal from the common modulation unit, each arithmetic logic unit receiving a modulated signal from a respective one of the plurality of individual modulation drivers, and each arithmetic logic unit outputting a mixed modulation signal, and a plurality of light emitting units, each configured to receive one of the mixed modulated signals from the plurality of arithmetic logic units, respectively, and each of the plurality of light emitting units outputting a visible light signal representing the first visible light communication data and a respective one of the second visible light communication data, and wherein the apparatus for receiving visible light communication data comprises:

a common demodulation unit configured to receive a signal formed by a mix of a plurality of visible light signals individually modulated in a plurality of individual modulation units, and demodulating a first visible light communication data from the received signal;

a visible light separation unit configured to separate the received signal into the plurality of visible light signals individually modulated in the plurality of individual modulation units; and the plurality of individual demodulation units configured to receive the plurality of visible light signals respectively, and demodulating a second visible light communication data from the plurality of visible light signals.

6. The system as claimed in claim 5, wherein the visible light separation unit comprises a plurality of filters for extracting red, green, and blue lights respectively, and wherein the common demodulation unit demodulates a white light signal generated by a combination of the red, green, and blue lights, and the plurality of individual demodulation units respectively demodulate the plurality of visible light signals corresponding to red, green, and blue light.

7. The system as claimed in claim 6, wherein the common demodulation unit detects the white light signal through envelope detection.

* * * * *